Patented Jan. 3, 1950

2,493,544

UNITED STATES PATENT OFFICE 2,493,544

STABILIZATION OF XYLIDINE

John C. Munday, Cranford, N. J., assignor to Standard Oil Development Company, a corporation of Delaware No Drawing. Application December 28, 1943, Serial No. 515,970

1 Claim. (Cl. 260—578)

This invention relates to the stabilization of aromatic amines against deterioration by discoloration, etc., during storage.

Aromatic amines such as aniline, toluidine, xylidine, etc., are normally substantially colorless when freshly prepared or freshly distilled, but tend to darken in color during storage, the undesirable results being greatly accelerated by storage at elevated temperatures.

The object of the present invention is to stabilize such aromatic amines against discoloration during storage.

Broadly, the invention comprises adding to the aromatic amines a small amount of a stabilizer comprising essentially a pure thiocarbanilide or alkylated derivative thereof, and preparing such stabilizers from crude or commercially available aromatic amines by reacting them with carbon disulfide, and purifying the resultant product.

Although the amount of the stabilizer to be used may vary according to the intended duration of storage and the temperature of storage, as well as according to the particular aromatic amine and the particular stabilizer used, in general about .01% to 3.0% of stabilizer will be sufficient, and usually about .05% to 0.5% by weight of stabilizer will be found most practical for giving satisfactory results.

Although the invention is intended to apply broadly to the stabilization of any type of aromatic amines, it is believed particularly applicable to alkaryl amines, especially those having from 1 to 3 alkyl carbon atoms. The invention has been found very successful for the stabilization of xylidine, either the pure separate isomers, or mixtures thereof. Other alkaryl amines which may be stabilized include the toluidines, ortho, meta or para, or mixtures thereof, the several ethyl anilines, cumidine (which is isopropylaniline), etc. Dialkylated and trialkylated aryl amines are preferred. Although the invention is particularly applicable to such alkaryl amines, it may also be used for stabilizing aniline, naphthylamines, and the various derivatives of aniline in which either or both of the hydrogens of the amino group are substituted by hydrocarbons, i. e., either alkyl or aryl groups, e. g., in N-monomethyl aniline, N-dimethyl aniline, N-monoethyl aniline, etc. Thus although the invention is particularly applicable to alkaryl primary amines, other amines such as secondary and tertiary amines may also be used.

The various above described aromatic amines may be stabilized alone or together with a diluent, such as a hydrocarbon solvent, e. g., naphtha. Such diluents may be present in amounts ranging from only a few per cent up to 10, 20 or even 100 times the volume of the aromatic amines, as when added to gasoline for use in internal combustion engines.

In carrying out the invention, it is preferred to add the stabilizer to the aromatic amines as soon as the latter has been prepared, or immediately after distillation.

The following experimental data will illustrate the advantages of the invention:

EXAMPLE 1

A stabilizer was prepared by treating 2 parts by vol. of commercial xylidine (freshly redistilled mixture of isomeric xylidines), with 1 vol. of carbon disulfide at room temperature, allowing evolved hydrogen sulfide to escape over a period of several days. The resultant mixed tetramethyl thiocarbanilides were then purified by adding several volumes each of ether and petroleum ether, to dissolve unreacted and partly reacted materials. The product, a white crystalline solid, was then filtered and dried for use as stabilizer. After purification the product is not soluble in ether; apparently the unreacted amine or $CS_2$ in the crude product solubilizes the thiocarbanilide.

A sample of freshly redistilled xylidine (a mixture of various isomeric xylidines) was then tested for color stability by heating in an open test tube at 194° F. as an accelerated stability test, periodically determining the color, or optical density, in a Hellige-Diller photoelectric colorimeter, using a North Sky filter. 21 hours were required for the sample to darken to a color density of 1.0, which is equivalent to 10% transmission where pure water gives 100% transmission. On the other hand, 0.2% of the stabilizer prepared as described above was added to another sample of the same redistilled xylidine and the mixture was subjected to the same accelerated stability test. The mixture, which had an optical density of .01 at the beginning of the test, was found to have an optical density of 1.0 at the end of 140 hours of heating, thereby indicating that the stabilized xylidine required 140 hours to darken to the same extent, i. e. 10% transmission, as the unstabilized xylidine darkened during 21 hours of heating.

EXAMPLE 2

A series of tests was made in order to compare the relative effectiveness of an addition agent prepared as described above according to this invention, as distinguished from several materials recently marketed for a similar use, such materials being referred to herein as commercial additives A and B, respectively. In this case the additive was prepared from pure p-xylidine and carbon disulfide, thus producing a tetramethyl thiocarbanilide, di-p-xylyl thio urea. The results of this series of tests which were carried out by heating a freshly redistilled xylidine containing 0.2% of the various additives in an open test tube in an oven at 194° F., are shown in Table I.

*Table I*

| Test No. | | No. of Hrs. Required for the Sample to Darken to 10% Transmission |
| --- | --- | --- |
| 1 | Xylidine alone | 30 |
| 2 | Xylidine + 0.2% commercial Additive A | 29 |
| 3 | Xylidine + 0.2% commercial Additive B | 30 |
| 4 | Xylidine + 0.2% Additive of this invention | 83 |

EXAMPLE 3

Another series of color stability tests at 194° F. was made employing a different freshly distilled commercial xylidine as the base stock. The results obtained with 0.2% of commercial additive C, and with 0.05% and 0.01% of the additive prepared as described in Example 1 are shown in Table II.

*Table II*

| Test No. | | No. of Hrs. Required for the Sample to Darken to 10% Transmission |
| --- | --- | --- |
| 1 | Xylidine alone | 17 |
| 2 | Xylidine+0.2% commercial Additive C | 20 |
| 3 | Xylidine+0.01% Additive of this invention | 25 |
| 4 | Xylidine+0.05% Additive of this invention | 27 |

The tests of Examples 2 and 3 show that the additive prepared according to this invention is far more active than commercial additives A, B and C.

A suitable method of purifying the additives of this invention, after reaction of the commercial aromatic amine, such as xylidine with carbon disulfide, is to extract the unreacted amine from the crude reaction product by a suitable solvent such as petroleum ether. If desired, the white solid product may be recrystallized, for example from hot alcohol, to obtain essentially pure di-xylyl thiourea. During the reaction of the xylidine with carbon disulfide, the evolved hydrogen sulfide gas may either be permitted to escape or stripped out with an inert gas or may be reacted with alkali which may be added directly to the reaction mixture. The reaction is hastened by heating, but too high a temperature causes deep seated changes and should be avoided.

Instead of using a commercial xylidine as raw material one may use other commercial aromatic amines such as aniline, toluidine, or any one particular xylidine isomer, such as p-xylidine, or even slightly higher alkylated aromatic amines or mixtures thereof, or one may use pure aromatic amines of the types described, in which latter case the reaction product will not require as extensive purification as may be desirable for the treatment of a product obtained from a crude or commercial aromatic amine material.

It has been found that the reaction of carbon disulfide is much slower with mixed commercial xylidines than with pure p-xylidine, although the final products do not differ greatly in potency as color stabilizers. It has also been found that the reaction occurs in steps. The first step is believed to comprise the addition of carbon disulfide to a xylidine molecule, while the second step, which ordinarily is quite slow, probably comprises reaction of the intermediate product with a second molecule of xylidine, evolving hydrogen sulfide. At least, after removing unreacted carbon disulfide by distillation from the reaction mixture, hydrogen sulfide continues to evolve for hours even on warming. It is believed that the step-wise mechanism offers an explanation for the experimental fact that carbon disulfide itself is much less potent as a color stabilizer of amines than are the products of this invention, in that the intermediate product is a poor color stabilizer, and serious color degradation occurs before the concentration of the final product reaches an effective amount. Another important advantage over the use of carbon disulfide is the absence of hydrogen sulfide dissolved in the stabilized amine which increases corrosion of metals, and when used in motor fuels increases the copper dish gum and decreases susceptibility to octane number improvement by tetraethyl lead. On the other hand, satisfactory results can be obtained by adding carbon disulfide to the amine to be stabilized and completing the reaction prior to exposure to the atmosphere, by blowing with an inert gas or treating with alkali, such as sodium hydroxide or carbonate, to remove hydrogen sulfide.

EXAMPLE 4

In another series of tests at 194° F. on xylidine from a different source, the additive prepared as described in Example 1 was compared with commercial additives A, B, C, D and E. The results are shown in Table III.

*Table III*

| Test No. | | No. of Hrs. Required for the Sample to Darken to 10% Transmission |
| --- | --- | --- |
| 1 | Xylidine alone | 16 |
| 2 | Xylidine+0.24% commercial Additive A | 16 |
| 3 | Xylidine+0.24% commercial Additive B | 15 |
| 4 | Xylidine+0.24% commercial Additive C | 21 |
| 5 | Xylidine+0.24% commercial Additive D | 13 |
| 6 | Xylidine+0.24% commercial Additive E | 11 |
| 7 | Xylidine+0.24% commercial Additive C +0.1% Additive of this invention | 27 |

The above examples show the superiority of the additive of this invention over other additives. Also shown is the difference in response to various additives of the various base xylidines, and the fact that in every case the response to the additive of this invention is very great.

Although the mechanism of the operation of the invention is not understood with certainty, it is believed that during the storage, the aromatic amine must necessarily undergo some chemical reaction such as oxidation, polymerization or condensation, which is subject to inhibition by the thiocarbanilide or alkylated derivative thereof.

It is not intended that this invention be limited to the particular materials which have been given merely for the sake of illustration, nor by any theory as to the mechanism of the operation of the invention, but only by the appended claim in which it is intended to claim all novelty inherent in the invention as well as all modifications coming within the scope and spirit of the invention.

I claim:

The method of stabilizing commercial xylidine against discoloration during storage which consists in reacting carbon disulfide with a small portion thereof to form corresponding tetramethyl thiocarbanilide derivatives, recovering the latter in substantially pure crystalline form and adding the same in a concentration of about .01% to 3.0% to the large portion of xylidine to be stabilized.

JOHN C. MUNDAY.

REFERENCES CITED

The following references are of record in the file of this patent:

UNITED STATES PATENTS

| Number | Name | Date |
|---|---|---|
| 1,916,438 | Rather et al. | July 4, 1933 |
| 1,947,578 | Bond | Feb. 20, 1934 |
| 2,043,258 | Missbach | June 9, 1936 |
| 2,106,552 | Jenkins | Jan. 25, 1938 |
| 2,154,341 | Martin | Apr. 11, 1939 |
| 2,161,772 | Carswell | June 6, 1939 |
| 2,434,651 | Robertson | Jan. 20, 1948 |

FOREIGN PATENTS

| Number | Country | Date |
|---|---|---|
| 340,572 | Great Britain | Dec. 29, 1930 |
| 432,480 | Great Britain | July 22, 1935 |

OTHER REFERENCES

Chem. Abstracts, vol. 28 (1934), page 1335.